United States Patent [19]

Shorter

[11] Patent Number: 4,969,092

[45] Date of Patent: Nov. 6, 1990

[54] METHOD FOR SCHEDULING EXECUTION OF DISTRIBUTED APPLICATION PROGRAMS AT PRESET TIMES IN AN SNA LU 6.2 NETWORK ENVIRONMENT

[75] Inventor: David U. Shorter, Lewisville, Tex.

[73] Assignee: IBM Corp., Armonk, N.Y.

[21] Appl. No.: 251,280

[22] Filed: Sep. 30, 1988

[51] Int. Cl.$^5$ ............................................. G06F 9/00
[52] U.S. Cl. ................................... 364/200; 364/280; 364/281.3; 364/281.8
[58] Field of Search ........................ 364/200, 300, 900

[56] References Cited

U.S. PATENT DOCUMENTS 4,318,173  3/1982  Freedman et al. .................. 364/200

OTHER PUBLICATIONS

An Introduction to Advanced Program-To-Program Communication (APPC), GG24-1584-01, IBM.
Systems Network Architecture—Concepts and Products, GC-3072-3, IBM.
Systems Network Architecture—Transaction Programmer's Reference Manual for LU Type 6.2, GC30-3084-2, IBM.
Systems Network Architecture—Technical Overview, GC30-3073-2, IBM.

*Primary Examiner*—Raulfe B. Zache
*Attorney, Agent, or Firm*—Richard E. Cummins; James H. Barksdale

[57] ABSTRACT

A method for scheduling time initiated tasks from an Intelligent Work Station (IWS) of an SNA network in which a host processor has created a plurality of run ready virtual machines which are assigned under control of a Virtual Machine Pool Manager in response to an LU 6.2 allocate verb to establish an LU 6.2 conversation between distributed parts of an application program, one part of which is resident at the IWS and the other part of which is resident at the host. A distributed application program named BATCH is provided, Part A of which is resident on the user's IWS and Part B of which is resident on the host processor. Part B is functionally a component of Virtual Machine Pool Manager (VMPM). The BATCH program allows the user to tranfer information regarding the task that is to be initiated at a designated time, to the host processor. The user invokes the BATCH program which prompts the user for the name of the application program which is to be time initiated, the time that the program is to be initiated, and the name of the processor on which the named application is to be executed. When the named application is to be executed on a host processor other than the host processor assigned to the IWS, the user may specify a transfer time for the local processor to forward the information to the target host processor. The user may also specify a plurality of host locations where the application is to be run. The method also provides at the host processor a Time Application Information Table. The function of the TAIT is to maintain information on time initiated tasks that are frequently scheduled so that the user may be relieved of much of the data entry.

12 Claims, 12 Drawing Sheets

| | |
|---|---|
| END USER | PROGRAMS FOR END USER |
| NAU SERVICES | MANAGE NETWORK<br>SESSION SERVICES<br>PRESENTATION SERVICES |
| DATA FLOW CONTROL | MAINTAIN SEND-RECEIVE<br>MODES. HIGH LEVEL<br>ERROR CORRECTING |
| TRANSMISSION CONTROL | SESSION LEVEL PACING<br>ENCRYPTION AND DECRYPTION |
| PATH CONTROL | ROUTING<br>SEGMENTING DATA UNITS<br>VIRTUAL ROUTE PACING |
| DATA LINK | ERROR CONTROL, LINK LEVEL<br>ADDRESS SEQUENCING |
| PHYSICAL | SIGNAL CHARACTERISTICS OF<br>CONNECTOR PIN ASSIGNMENTS |

FIG. 3A

| VMNAME | TPNNAME | USERID | PCID | IDIC | CONVID |
|---|---|---|---|---|---|
| VM01 | | | | NO | |
| VM02 | | | | NO | |
| VM03 | | | | NO | |
| VM04 | | | | NO | |
| | | | | NO | |
| VMnn | | | | NO | |

```
NAME OF JOB =
TIME-1      =
TIME-2      =
LOCATION    =
```

METHOD FOR SCHEDULING EXECUTION OF DISTRIBUTED APPLICATION PROGRAMS AT PRESET TIMES IN AN SNA LU 6.2 NETWORK ENVIRONMENT

CROSS REFERENCE TO RELATED APPLICATIONS:

U.S. application Ser. No. 07/261,861, entitled "Method to Provide Concurrent Execution of Distributed Application Programs by a Host Computer and an Intelligent Work Station on an SNA Network" which is filed concurrently herewith and assigned to the Assignee of the present invention, is directed to a method for executing LU 6.2 conversations for distributed application programs which involves creating a pool of virtual machines at the host which are maintained in a run ready idle state until assigned by a Virtual Machine Pool Manager, to a request from a terminal executing a first part of a distributed application program, for a conversation with the second part of the distributed application program stored at the host system.

U.S. application Ser. No. 07/250,598, entitled "Method to Manage Concurrent Execution of a Distributed Application Program by a Host Computer and a Large Plurality of Intelligent Work Stations of an SNA Network" which is filled concurrently herewith and is assigned to the Assignee of the present invention, is directed to a method for providing improved communications between distributed portions of an application program that is being executed on a network simultaneously by a relatively large number of terminals, in which a pool of virtual machines is created at the host and each machine is primed (initialized) with the host resident portion of the program. When a conversation request is received at the host and assigned to a virtual machine in the pool, the machine is ready to accept the request and begin processing immediately. The pool manager monitors the use of the pool relative to anticipated demand and adjusts the size accordingly in accordance with an established algorithm.

FIELD OF INVENTION:

This invention relates in general to LU 6.2 type interprogram communication methods in SNA data processing networks and in particular to a method to permit a system user to schedule from a network terminal the automatic execution of a specified distributed application program at a specified future time by a specified host processor on the network.

BACKGROUND ART:

The prior art discloses a variety of computer networks. The IBM System Journal, Volume 22, Number 4, 1983 includes a series of articles devoted to a review of the IBM System Network Architecture (SNA). On page 345 of that publication a network is defined as "a configuration of terminals, controllers, and processors and the links that connect them. When such a configuration supports user applications involving data processing and information exchange and conforms to the specifications of the System Network Architecture it is called an SNA network. Essentially SNA defines logical entities that are related to the physical entities in a network and specifies the rules for interactions among these logical entities.

The logical entities of an SNA network include network addressable units and the path control network that connects them. Network addressable units communicate with one another using logical connections called "sessions." The three types of Network Addressable Units (NAUs) are the Logical Unit (LU), the Physical Unit (PU), and the System Services Control Point (SSCP) which are defined as follows;

Logical Unit (LU). An LU is a port through which end users may access the SNA network. An end user uses an LU to communicate with another end user and to request services of a System Services Control Point (SSCP).

Physical Unit (PU). A PU is a component that manages the resources of a node in cooperation with an SSCP.

System Services Control Point (SSCP). This is a focal point for configuration management, problem determination and directory services for end users. SSCPs may have sessions with LUs and PUs. When such a session occurs, the LU or PU is in the domain of the SSCP. In addition to sessions with LUs and PUs, SSCPs may also communicate with each other to coordinate the initiation and the termination of sessions between Logical Units and in different domains."

From the hardware standpoint, a simple network comprises a host system having a processing unit and a plurality of remote terminals that are assigned to individual users. The remote terminals are selectively connectable to the host system through one or more communication links. These links may comprise merely a coaxial cable, a dedicated telephone line, or in some cases, a satellite communication link.

The host processing unit most always has an operating system which supports the creation of a large number of virtual machines or the functional equivalents, each of which is assigned, on request, to an end user. A virtual machine processes tasks for the assigned end user, by time sharing the host processor hardware of the host system. Some hosts systems may include more than one hardware processor so that true simultaneous processing occurs at the host since a plurality of processors are running in parallel. More often, there is merely one hardware processor that "concurrently" runs data processing tasks for the virtual machines by a time sharing technique. This is transparent to the end users at the terminals.

Two general types of terminals are employed in data processing networks. The first is referred to as a "dumb terminal" in that it comprises merely a keyboard and a display device and little or no processing capability other than that required to make a connection with the host system. The second type of terminal is referred to as an Intelligent Work Station (IWS) and is provided with its own processor unit, Operating System and supporting peripheral devices. The terms IWS and Personal Computer (PC) are often used interchangeably. With the ready availability of PCs having very attractive price performance characteristics, most new networks are implemented with IWS type terminals and many of the older networks are being modified with the replacement of dumb terminals with IWS type terminals.

Providing each end user on the network with its own processing capability relieves the host CPU from doing many of the data processing tasks that were previously done at the host. The nature of the tasks that are processed by the host CPU therefore has changed and more sophisticated applications such as electronic mail and electronic calendaring are now implemented on the network under the control of the host system. Both of these applications involve what is referred to as distributed application programs, in that one part of the application program is resident on the host system and another is resident on the IWS terminal.

Many of the current data processing networks are designed in accordance with the IBM SNA architecture which was first described in 1974. Since then various new functions and services have been added. As suggested earlier, SNA networks can be viewed as a plurality of nodes interconnected by data links. At each of these nodes, path control elements send information packets, referred to as Path Information Units (PIUs), between resource managers called Logical Units. The logical connections of the paths are called a session. A transport network for data is therefore defined by the path control elements and the data link control elements.

Nodes can be connected by a plurality of links and comprise a plurality of LUs. Various types of LUs sessions and protocols have been established within the framework of the SNA architecture. There are three general classes of sessions. The first class is unspecified by SNA. The second class involves terminals and the third involves program to program communication. For example LU 6 provides SNA defined inter-program communication protocols which avoids the limitations of terminal LU types such as LU 2 and LU 7. LU 6.2 is referred to as Advanced Program to Program Communication or APPC protocols.

Logical Units are more than message ports. LUs provide operating system services such as program to program communication involving one or more local programs. Each application program views the LUs as a local operating system and the network of loosely coupled LUs connected by sessions as a distributed operating system.

The LU allocates a plurality of resources to its programs, which are dependent on the particular hardware and its configuration. Some of the resources that are made available are remote while others are local, i.e., associated with the same LU as the application program. The sessions are considered local resources at each LU, but are shared between particular LUs.

The control function of an LU is resource allocation. Programs ask one for access to a resource. Sessions which carry messages between LUs or programs running on LUs are considered shared resources. A session is divided so that a plurality of conversations are run serially.

Two LUs connected by a session have a shared responsibility in allocating sessions to application programs for use as "conversations." The application programs are therefore sometimes referred to as "transaction programs."

The successful connection between LUs occurs as a result of a common set of protocols which function first to activate a session between two LUs and second to facilitate the exchange of message data.

The SNA format and protocol reference manual designated SC30-3112, published by the IBM Corporation describes SNA by describing, for example, with programming language declarations, the format of messages that flow between network entities and the programs that generate, manipulate, translate, send and return messages.

The SNA transaction program reference manual for LU 6.2 referred to as GC30-3084, published by the IBM Corporation defines the verbs that describe the functions provided by the implementing products.

Intelligent work stations that are connected to a SNA type network and employ an LU 6.2 protocol to process an application program that is distributed between the IWS and the host system operate efficiently so long as the operating system of the IWS does not run more than one application concurrently at the terminal. However, if the IWS is operating under an operating system such as OS/2, which allows an IWS such an IBM PS/2 personal computer to run concurrent application programs which are distributed, the advantage of concurrent operation on the PS/2 is lost. The advantage is lost because at the host, the separate transactions which are run concurrently at the terminal become serialized. The serialization of the transaction occurs because the host creates only one virtual machine that is permanently associated with the user ID and the specific terminal as long as the session is active.

In order to avoid the serialization at the host, the second application being run at the terminal has to be run with a different user ID in order to have a separate virtual machine established at the host that will be dedicated solely to the second application.

The invention described in the cross-referenced application Ser. No. 07/261,861 directed to a method to permit two or more distributed applications that are being run concurrently on one intelligent work station of a data processing network to be executed on separate virtual machines created by the host system to prevent the applications from becoming serialized at the host and to allow each to be run concurrently with the other on both the host and the terminal.

With the method of the cross-referenced application, the host system creates a plurality of virtual machines (VMs) that are brought to a run ready state prior to and in anticipation of being assigned to a distributed application program for processing a task which has been defined in said distributed application program, part of which is resident on the host system and the companion part of which is resident on one of the IWS end user terminals. The pool of run ready VM machines are preferably created automatically at the time that the host system is initialized under the control of a pool manager, which is a program resident on the host system, whose other main function is to assign an idle VM machine from the pool in response to an end user request that identifies a distributed application program, a previously assigned Logical Unit name and a USERID. The VM is assigned only for a period of time required to complete one LU 6.2 conversation. At the end of the conversation the VM machine is returned to the pool for subsequent assignment to another, possibly different, application program and user. The method allows two distributed application programs being executed concurrently on the IWS to run concurrently on the host in two separate virtual machines even though the conversation requests have the same USERID.

While the above system improves the processing of distributed application programs, it requires a new method to schedule time initiated tasks that is different than the method used to schedule time initiated tasks in prior art SNA networks since in the new system described in the cross-referenced application a dedicated virtual machine is no longer assigned to a system terminal to process all the tasks that are requested from that terminal. In the prior method of scheduling time initiated tasks, a component of the operating system at the host stored the information that was normally provided by the user when a program was to be run. A timer function of the operating system merely read the stored information requesting a specified program to be executed and effectively emulated what the user would be doing at the terminal, i.e. logging on with a pseudo terminal ID and the USERID of the user that had requested the time initiated task. Since the new environment at the host no longer assigns a dedicated virtual machine but establishes a Virtual Machine Pool Manager to be the interface to receive LU 6.2 requests for conversations sent from terminals in the form of LU 6.2 ALLOCATE verbs, the new method of scheduling time initiated tasks reflects the new interface that was established in the Virtual Machine Pool Manager.

It will be recalled that in the prior art method, a dedicated virtual machine that was named the USERID of the current user, was used to store the current terminal address of the user. This dedicated machine has been eliminated and replaced by a pool of virtual machines which are not permanently associated with either one user or one terminal address. Since virtual machines from the pool are assigned dynamically to process relatively short LU 6.2 type conversations between the host and the terminals, and then returned to the pool, the prior art method of scheduling time initiated tasks is no longer applicable.

The method of the present invention, allows a system user to schedule from a system terminal, a time initiated task represented by a distributed application program, to be executed at a specified time on a specified host processor of the SNA network, employing a virtual machine from the pool which is assigned by the Pool Manager of the designated host processor.

SUMMARY OF THE INVENTION:

In accordance with the method of the present invention, a distributed application program named BATCH is provided, Part A of which is resident on the user's Intelligent Work Station and Part B of which is resident on the host processor. Part B is functionally a component of Virtual Machine Pool Manager (VMPM). The BATCH program allows the user to transfer information regarding the task that is to be initiated at a designated time, to the host processor. The user invokes the BATCH program which prompts the user for the name of the application program which is to be time initiated, the time that the named application program is to be initiated, and the name of the processor on which the named application is to be executed. If the named application is to be executed on a host processor other than the host processor assigned to the IWS, the user may specify a transfer time for its host processor to forward the information to the other host processor. In addition the user may also specify a plurality of host locations where the application is to be run. The method also provides at the host processor a Time Application Information Table that is available to the VMPM at the time that it is initialized, which is normally when the host processor is initialized. The function of the TAIT is to maintain information on time initiated tasks that are frequently scheduled so that the user may be relieved of much of the data entry.

The Time Function (TF) component of the VMPM upon receiving the request from the user and the information supplied by the BATCH program and TAIT, creates a Time Control Block Entry (TCBE) for each scheduled execution of the named application program. A queue of TCBEs are maintained by the VMPM-TF component which is also responsible for activating the tasks at the proper time. The VMPM-TF employs the normal timer services of the host operating system to alert the VMPM-TF that the time has arrived for one or more of the TCBEs to be activated. Generally these timer services require the caller to specify a time interval to occur before the timer services returns to "wake-up" the caller. When the appointed time arrives, the VMPM-TF employing the information in the TCBE, issues an LU 6.2 ALLOCATE verb to the specified host. The ALLOCATE appears to the host to have been issued by the user from his terminal. The VMPM assigns an idle virtual machine from the pool to service the request from the VMPM-TM and the scheduled task is then executed in a conventional manner as if the ALLOCATE request had come from the user's IWS.

It is therefore an object of the present invention to provide an improved method for scheduling time initiated tasks represented by distributed application programs in a data processing network.

Another object of the present invention is to provide a method for scheduling time initiated tasks represented by distributed application programs in an SNA type data processing network in which a pool of virtual machines is established at each of the host processors.

A further object of the present invention is to provide a method for processing distributed application programs in an SNA type network employing LU 6.2 protocols, whereby an end user can schedule a specified program to be automatically executed on a specified host process at a specified future time without further involvement of the end user.

Objects and advantages other than those mentioned above will become apparent from the following description when read in connection with the drawing.

DESCRIPTION OF THE DRAWING:

FIGS. 3A and 3B illustrate the organization of the various layers of programming that are involved in the SNA network of FIG. 1.

Figure 1:
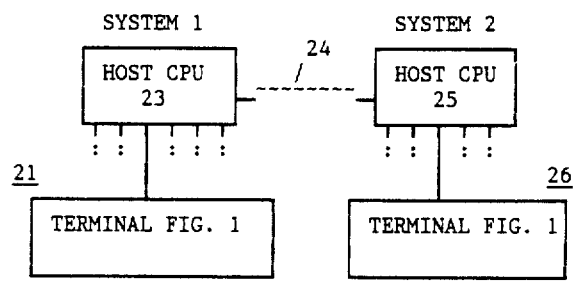
FIG. 1 is a schematic design of a data processing network.
Figure 2:
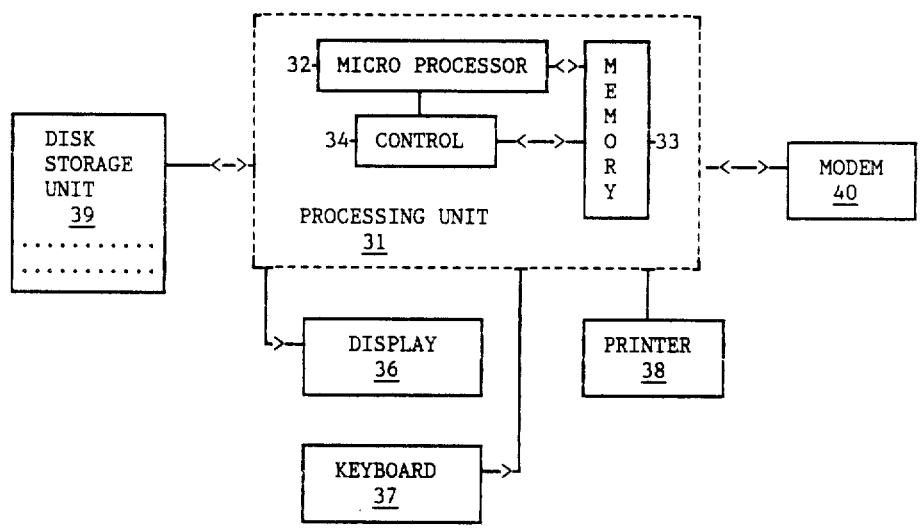
FIG. 2 is a schematic representation of one of the IWS terminals shown in FIG. 1.

DESCRIPTION OF THE PREFERRED EMBODIMENT:

FIG. 1 illustrates an information handling system comprising an SNA network 20 of interactive type terminals or Intelligent Work Stations (IWS) 21 of the type shown in detail in FIG. 2. As described, the network includes a plurality of terminals 21 which are interconnected to a host central processing system 23. As shown in FIG. 1, host 23 in turn is connected by communication link 24 to a host processing system 25, which also connects to another SNA network 26 of interactive terminals 21. Functionally, the system operates to allow each terminal or end user to communicate with the host and to one or more other terminals or users using established SNA communication protocols so that the various serially connected communication links are transparent to the users.

The host system includes a host processing unit which may by way of example be an IBM 370 system. A virtual machine type operating system, such as the IBM VM Operating Systems, is assumed in the description of the preferred embodiment.

It should be assumed that the SNA network shown in FIG. 1 supports two distributed applications referred to as "MAIL" and "CALENDAR" which are available to each terminal user. The MAIL application program allows a user at one terminal to generate a document such as a letter and send that letter to one or more other users at a designated nodes on the network. The sender can store the document in the host system at some logically central system location. Each addressee of the letter has the capability of retrieving that document at a later time by also using the MAIL application program from his terminal. The CALENDAR application functions to maintain an electronic calendar for each terminal user. The CALENDAR application, for example, allows one end user to view other end users' calendars prior to scheduling a meeting in order to determine free periods of those persons being invited to the meeting. Such systems are well known in the art and are currently an extensive commerical use. Since the general organization and operation of such distributed applications is well known, only those details that are necessary for an understanding of the method of processing data in distributed application programs of the present invention will be described.

It should therefore be assumed in the following description that each workstation on the network is an Intelligent Work Station such as an IBM PS 2 personal computing system employing a multi-tasking operating system such as the IBM OS/2 Operating System. It may be further assumed that conventional SNA services to support Logical Unit type LU 6.2 for distributed applications are provided by the system. The terminal shown in FIG. 1 may therefore process two distributed application programs such as MAIL and CALENDAR concurrently.

FIG. 2 illustrates the functional components of one of the interactive type data processing terminals 21, shown in FIG. 1. The terminal comprises a processing unit 31, which includes a microprocessor block 32, which is, for example, an Intel 80386 micro-processor, a semi-conductor memory 33, a control block 34 which functions to control input-output operations in addition to the interaction between the microprocessor block 32 and the memory unit 33.

The terminal further includes a group of convention peripheral units including a display device 36, keyboard 37, printer 38, a storage unit 39, and modem 40. Since the details of the above described functional blocks form no part of the present invention and can be found in the prior art, only brief functional description of each block is set forth along with the description of their interaction, sufficient to provide a person of ordinary skill in the art with the basis of understanding applicant's improved method of processing distributed application programs concurrently.

Processing unit 31 corresponds, for example, to the system unit of an IBM personal computer such as the IBM PS/2 model 80 system. Unit 31 is provided with an operating system program which may be the IBM multi-tasking OS/2 operating system which is normally employed to run the PS/2 model 80. The operating system program is stored in memory 33 along with the application programs that the user has selected to run. When the system supports a distributed application program such as MAIL or CALENDAR, only one part, e.g., part A of the distributed application program is stored at the terminal while the other part, part B, is stored at the host system. Depending on the capacity of memory 33 and the size of the application programs, portions of these programs as needed may be transferred to memory 33 from the disk storage unit 39 which may include, for example, a 40 megabyte hard disk drive and a diskette drive. The basic function of storage unit 39 is to store programs and data that are employed by the system and which may readily be transferred to the memory unit 33 when needed. The function of the diskette drive is to provide a removable storage function of entering programs and data into the system and a vehicle for storing data in a form that is readily transportable for use on other terminals or systems.

Display 36 and keyboard 37 together provide for the interactive nature of the terminal, in that in normal operation the interpretation that the system gives to a specific keystroke by the operator depends, in substantially all situations, on what is being displayed to the operator at that point in time.

In some situations the operator, by entering commands into the system, cause the system to perform a certain function. In other situations, the system requests the entry of certain data generally by displaying a prompt type of menu/message screen. The depth of the interaction between the operator and the system varies by the type of operating system and the application program, but is a necessary characteristic of terminals on which the method of the present invention may be employed.

The terminal shown in FIG. 2 further includes a printer 38, which functions to provide hard copy output of data. Lastly, the modem 40 functions to transfer data from the terminal 21 of FIG. 2, to a host system through one or more SNA communication links.

FIG. 3 shows the various layers of programming that are employed in an SNA type network. The SNA programming environment is generally considered to consist of seven layers as shown. The top layer as shown is the End User layer and consists of the end user programs. The second layer is called the NAU Services. These services include, for example, presentation services, terminal services and formatting data for specific applications. The third layer is referred to as Data Flow Control. Its function is to maintain send/receive modes and perform high level error correction. The fourth layer is the data Transmission Control layer. Its function involves such things as encryption and decryption plus session level pacing. The fifth layer is the Path Control which does routing, segmenting data units and virtual route pacing. The Data Link layer is the sixth layer. It functions to provide link level addressing, sequencing and error control. The seventh and last layer is the Physical layer which defines for example the pin assignments on connectors for the various signals.

APPC defines the NAU services, Data Flow Control and Transmission Control. As explained on page 306 of the previously referenced IBM Systems Journal, the method of defining the LU 6.2 conversation functions, is in terms of programming-language-like statements called verbs. Documentation with verbs which are completely defined by the procedural logic that generates session flows, provides significantly greater precision than English prose. FIG. 3A shows how the verbs define the interaction between transaction programs, i.e., part A or part B of the distributed application, and Logical Units for conversation resources. A set of verbs is referred to as a protocol boundary rather than as an application program interface.

As shown in FIG. 3A, the presentation services component interprets verbs and can be thought of as including a subroutine for each verb. The LU resource manager does allocation of conversation resources and assignment of conversations to the sessions, keeping queues of free sessions and pending allocation requests. Its equivalent component in products also allocates local resources in products specific ways. The function of the following LU 6.2 verbs is set forth on page 307 of the previously mentioned IBM System Journal. The 6.2 verbs discussed are one, SEND_DATA, RECEIVE_AND_WAIT, PREPARE_TO_RECEIVE, FLUSH, REQUEST_TO_SEND, SEND_ERROR, CONFIRM, ALLOCATE AND DEALLOCATE.

The ALLOCATE verb initiates new activity at another LU by building a conversation to a named partner program. The named partner is placed in execution and given addressability to the conversation that started it. The ALLOCATE verb carries several parameters including the following.

1. LU_NAME. This is the name of the LU at which the partner program is located.

2. TPN. TPN is the Transaction Program Name of the partner program with which the conversation is desired.

3. MODE_NAME. MODE_NAME specifies the type of transportation service that the conversation is to provide. For example, a SECURE, a BULK, or a LOW_DELAY conversation can be requested. The LU uses a session with the appropriate MODE_NAME to carry the conversation.

The target of the conversation is a newly created process or task, which means that the distributed processing in the network in any instance of time consists of a number of independent distributed transactions, each of which consists of two or more transaction programs connected by a conversation. The DEALLOCATE verb ends the conversation. In as much as each partner may issue DEALLOCATE, a conversation varies from a single short message to many exchanges of long or short messages. A conversation could continue indefinitely, terminated only be a failure of a Logical Unit or by the session that carries it. Transaction programs are not ended by DEALLOCATE, but continue until they terminate their own execution, end abnormally or are terminated by control operator action.

Both network application programs and service transaction programs use the execution services provided by Logical Units. Service transaction programs run on Logical Units in the same way as other transaction programs. They interact with the human operation or they may run as a pure programmed operator. Many service transaction programs effect only the local Logical Unit. An example is a command to display the current set of active transaction programs.

Other control transactions, especially those that relate to sessions, can effect other Logical Units as well as applications at other Logical Units. For example, a local command to prematurely terminate a transaction that is using a conversation causes the conversation to be ended abnormally, a state change that must be transmitted to the partner Logical Unit for presentation to the transaction program that is sharing the conversation. Or a decision to activate one or more of the sessions shared by the two LUs may be made by one LU operator but must be communicated to the other Logical Unit. Advanced program to program communication for SNA includes several control operator verbs that provide LU to LU control and coordination, especially for activation and deactivation of sessions. When a distributed service transaction program starts at one LU, it creates a conversation to a partner transaction program in a partner LU. The two transaction programs then cooperate to preform the desired control activity.

The IBM VM host operating system includes a component referred to as APPC/VTAM Services (AVS) which is responsible for the APPC protocol boundary support in the Operating System. AVS defines one or more LU 6.2 Logical Units to IBM Virtual Telecommunications Access Method (VTAM). VTAM is the IBM host computer component that manages the communications layer between the host and the various terminals of the network. AVS acts as a bridge for APPC communications to virtual machines within the operating system. For example, when an APPC ALLOCATE verb is received that originated from outside the VM operating system, VTAM will determine if there is a Logical Unit active that corresponds to the LU name specified in the ALLOCATE. AVS will have previously told VTAM that it will handle all traffic for particular LU names. VTAM will find that AVS has defined an LU that corresponds to the LU name in the ALLOCATE verb and pass the ALLOCATE verb to AVS.

There is additional information supplied with the ALLOCATE verb that is used in this process. Included in the ALLOCATE is a User ID, the identification of the user that the allocate was submitted in behalf of, and a Transaction Program Name (TPN). The TPN is the application program to be invoked, that is the part B of the distributed application such as MAIL. At the time AVS receives the ALLOCATE, it will create a virtual machine and pass the transaction program named in ALLOCATE to an operating system component that is resident in the virtual machine. The operating system component in the virtual machine will activate the named application and interaction can occur between the part A and part B of the application.

Figure 3B:
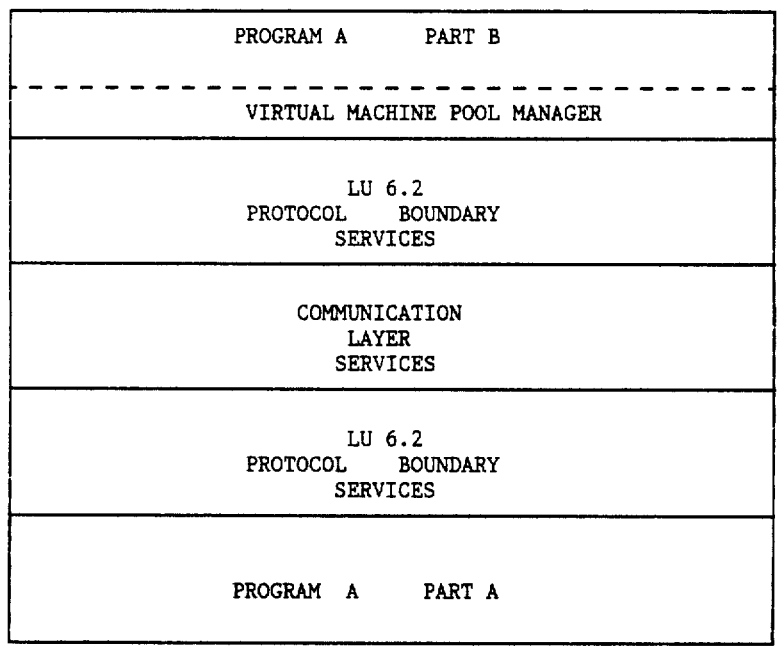

FIG. 3B is similar to the representation of the SNA programming environment shown in FIG. 3A and represents the SNA/AAPC programming environment in which the method of the present invention is advantageously employed.

Figure 4:
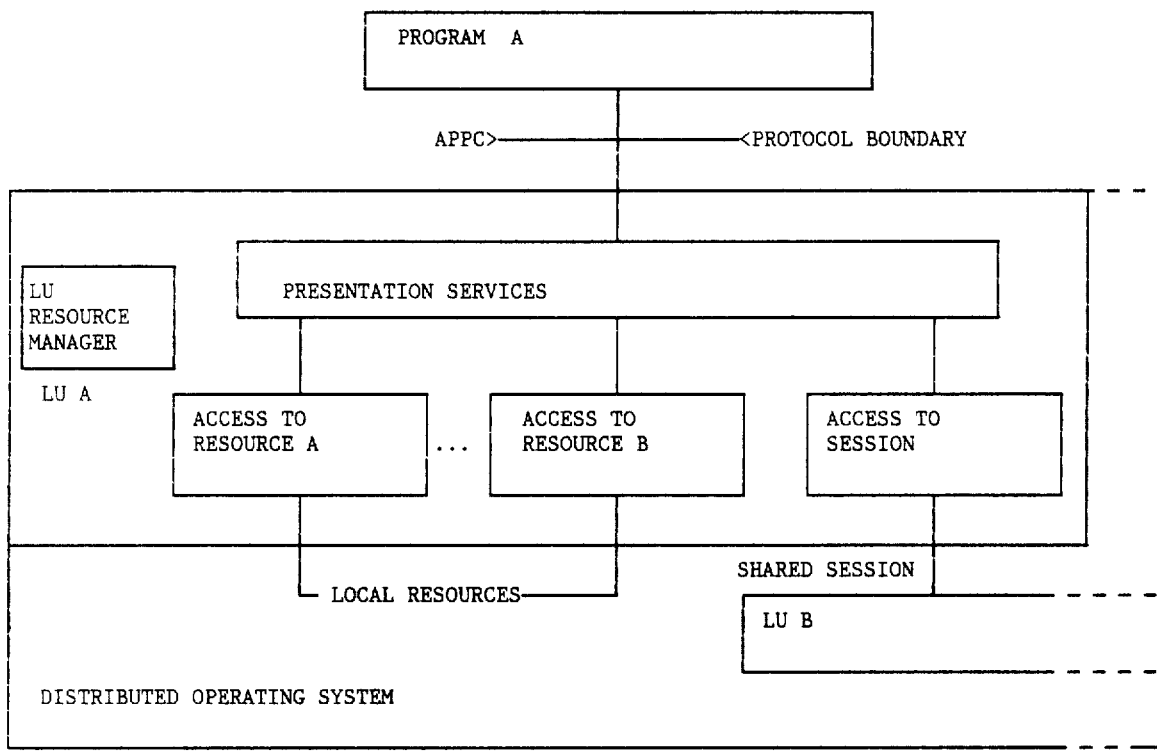
FIG. 4 the relationships between parts of a distributed application program and network programs.

As shown in FIG. 4 the IWS is provided with a programming organization which allows the terminal to run two application programs concurrently. An article entitled "Multiple Tasks" beginning on page 90 of Volume 5, Number 11, of the PC Tech Journal, published November, 1987 explains in detail the IBM OS/2 multi-tasking capabilities.

In the previous example, when the same terminal initiates a second distributed application program, it will be assigned the same virtual machine that has been created for the first distributed application program. As a result, the two application programs running on the host virtual machine become serialized, which defeats the overall purpose of providing an operating system at the terminal that is capable of multi-tasking operations.

In accordance with the method of the invention disclosed in the Cross-Referenced application Ser. No. 07/261,861, an additional function referred to as a VM Pool Manager (VMPM), shown schematically in FIG. 3B, has been added to the Protocol Boundary services of the prior art. The VMPM operates in the same virtual machine as does the Protocol Boundary services, which in the IBM VM operating system is called the AVS module. When activated, the VMPM will read a set of installation supplied parameters and create a plurality of virtual machines that are brought to the run ready state. Included in these parameters are generic names of the virtual machines to be created in the pool. The names or virtual machines IDs will previously have been defined in the Operating System's directory of virtual machines. The VMPM issues an Autolog macro for each of the machines. The Autolog macro is a known function in the VM operating system. When issued for a particular virtual machine, it will result in that machine being created and placed in a state such that it is waiting for work, in this case waiting for an APPC ALLOCATE verb to be passed from AVS.

Figures 5, 6:
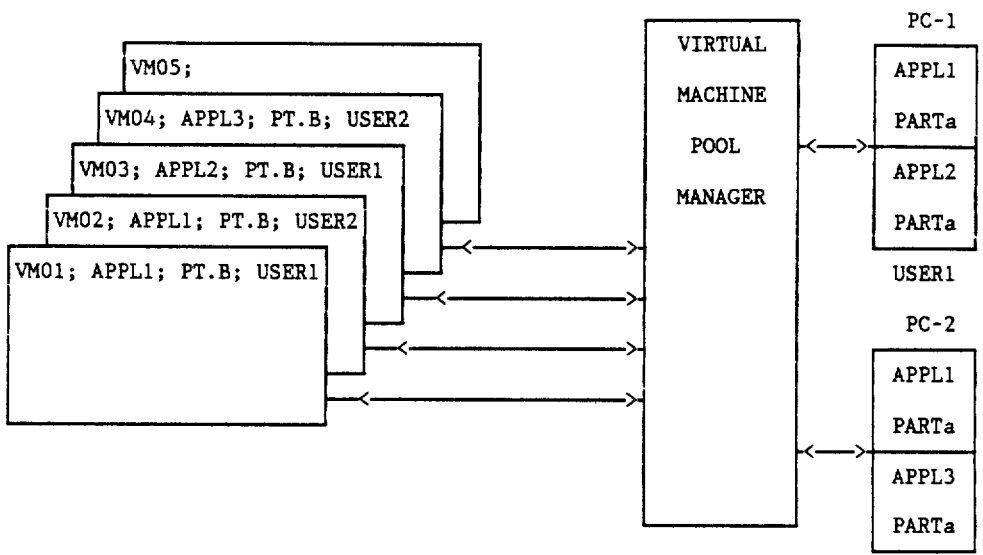
FIG. 5 is a schematic representation of the pool of run ready virtual machines that are created by the method of the present invention.
FIG. 6 illustrates the details of the Virtual Machine Pool Data Structure that is employed the by the Pool Manager in managing the pool of virtual machines shown in FIG. 5.

As each machine is successfully created by the Autolog macro, the VMPM will create an entry in a VMPM data structure shown in FIG. 6 representing that virtual machine and its state, in control blocks that are owned by the VMPM. When all virtual machines in the list have been created, the VMPM will return control to the AVS. After the virtual machines have been created and the pool manager has returned control to the AVS, the following scenario occurs.

The terminal operator interactively enters information into his terminal to invoke, for example, the distributed application program Mail. As a result of that, the "A" part of the Mail distributed application issues the ALLOCATE verb including the following parameters LU name=LU1,

TPN=MAIL,

USERID=DICKC.

When VTAM receives the ALLOCATE verb, it sees that an LU named LU1 was defined by AVS and it passes the allocate to AVS. AVS sees that LU1 is associated with the pool manager by scanning the pool manager data structure. It therefore activates the pool manager component of AVS and passes the ALLOCATE information to it. The second function of the pool manager is to scan its control block entries that represent virtual machines in the VM pool and look for one that is available for work. When it finds an available virtual machine, it changes the ALLOCATE parameters to the following:

LU NAME=VM01,

TPN=MAIL,

USERID=DICKC.

The pool manager changes the LU name to the name of the virtual machine in the pool. The pool manager also updates the control block entry that represents the virtual machine to show that it is no longer available. The pool manager then places information into the control block entry that reflects what the virtual machine is busy doing. The pool manager than re-issues the ALLOCATE verb with the changed LU name.

The VM operating system will then pass the ALLOCATE to the operating system code resident in the selected virtual machine. That code then activates the application part B named in MAIL and switches the ID of the virtual machine to the ID specified in the allocate verb which, in this case, was DICKC. A conversation is then conducted between part A and part B of the MAIL distributed application program. Similar interactions of the type described above can occur concurrently from a single multi-tasking PC or from multiple PCs. When the part A and part B complete their interaction, either may issue an APPEC DEALLOCATE verb to end the conversation. When a DEALLOCATE verb is received. AVS will invoke the pool manager and it will change the control block entry that represents the virtual machine that was involved. The pool manager will change the status of the virtual machine to an available state.

It will be seen that in accordance with the above process, a single conversation defined by an ALLOCATE and DEALLOCATE is handled by an assigned virtual machine from the pool of virtual machines under the control of the pool manager. The next conversation would undoubtedly be assigned to a different virtual machine from the pool. As a result, two distributed application programs that are being run concurrently from a single terminal with a single user ID are assigned by the VMPM, in accordance with the new method, to different VM machines that were created earlier by the virtual machine pool manager. This avoids the problem that exists in prior art systems and methods where two distributed application programs originating from the same terminal with the same user ID become serialized within one virtual machine at the host system.

Figure 7:
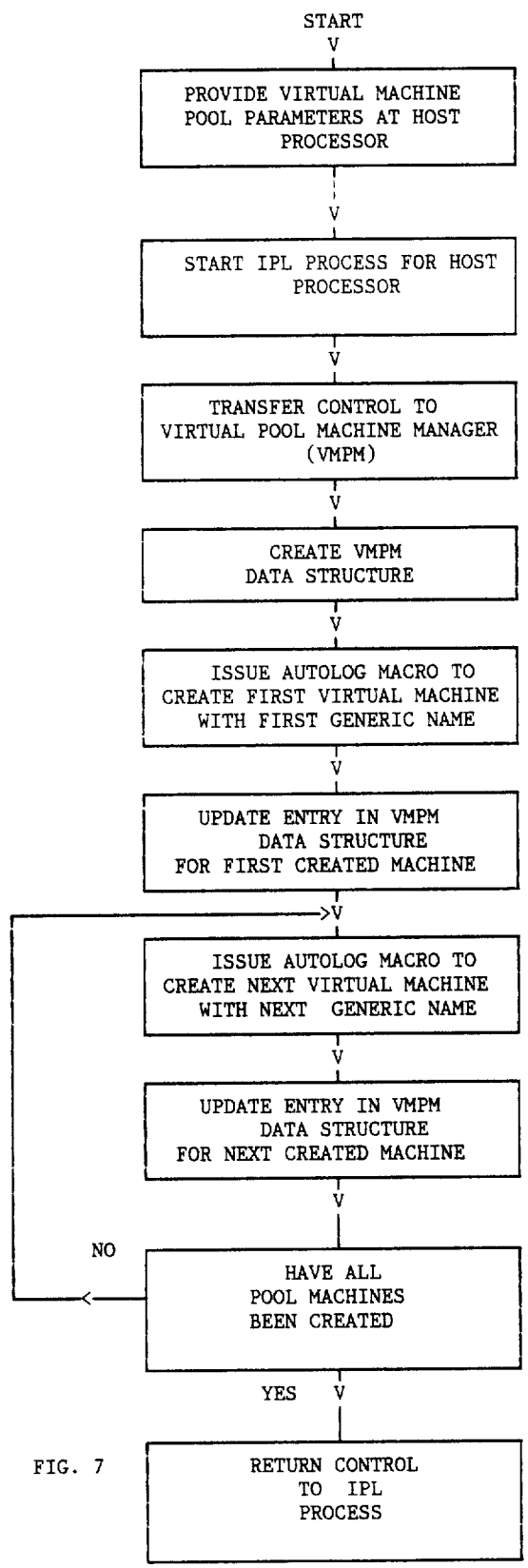
FIG. 7 is a flow chart setting forth the steps involved in creating the pool of virtual machines shown in FIG. 5.

FIG. 7 sets forth a flow chart of the steps involved in creating the virtual machine when the host system is initially IPLed. The flow chart of FIG. 7 summarizes the steps discussed above.

Figure 8A:
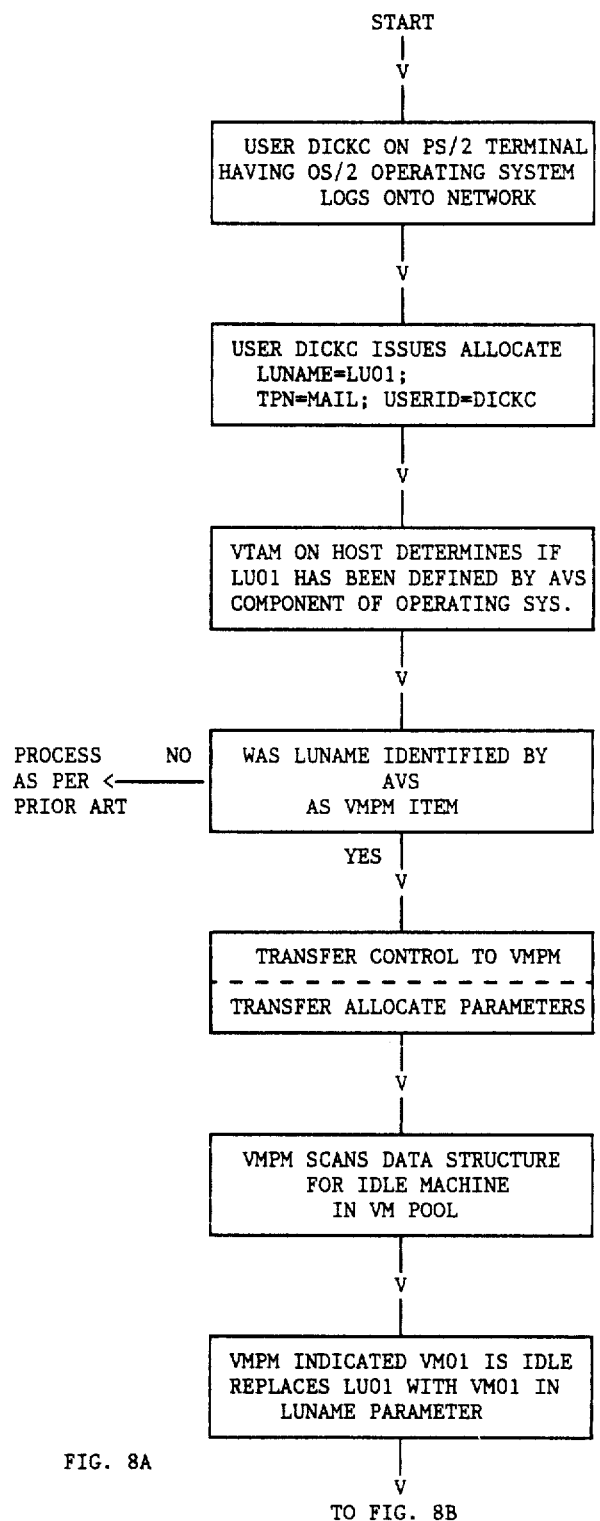
FIGS. 8A and 8B are a flow chart setting forth the steps involved by the Pool Manager in executing a distributed application program in accordance with the new method.
Figure 8B:
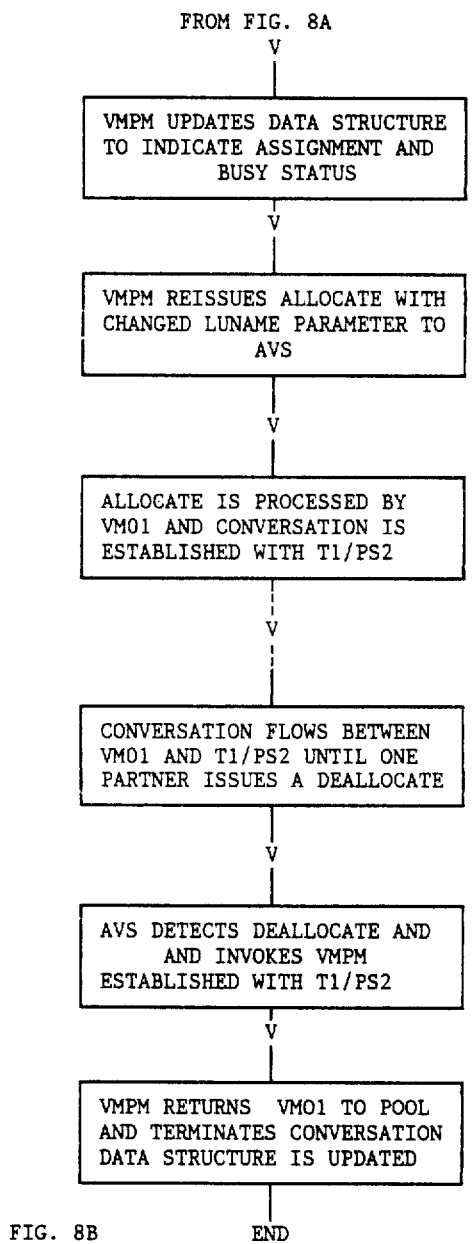

FIGS. 8A and 8B set forth a flow chart of the steps involved in the program to program communication process described above for distributed application programs.

The term "distributed application program" has been used in the above description with reference to a pair of programs that have been coded to communicate with each other using APPC verbs. One program executes on a terminal while the other executes on the host. The program that issues the first Allocate verb to intiate a conversation request is sometimes referred to as Part A of the distributed application program while the program addressed in the request has been referred to as Part B of the distributed application program. The term "transaction program" has been used with reference to either Part A or Part B of a distributed application program.

The prior art methods of scheduling tasks to be run automatically at the host processor at some predesignated time are no longer useable since the host processor no longer assigns a dedicated virtual machine to a specific user at the time that the user Logs-On. Since in the LU 6.2 network environment, the host maintains a pool of virtual machines which are assigned to process specific conversations under the control of a Pool manager, the new method of scheduling time initiated tasks must reflect the LU 6.2 protocols and the presence of the Pool Manager. The user's requests to the host processor for these time initiated tasks and the Pool Manager's subsequent response at the designated time to a host issued LU 6.2 ALLOCATE that appears to have been issued from the user's terminal provide the basis for the new method.

Figure 9:
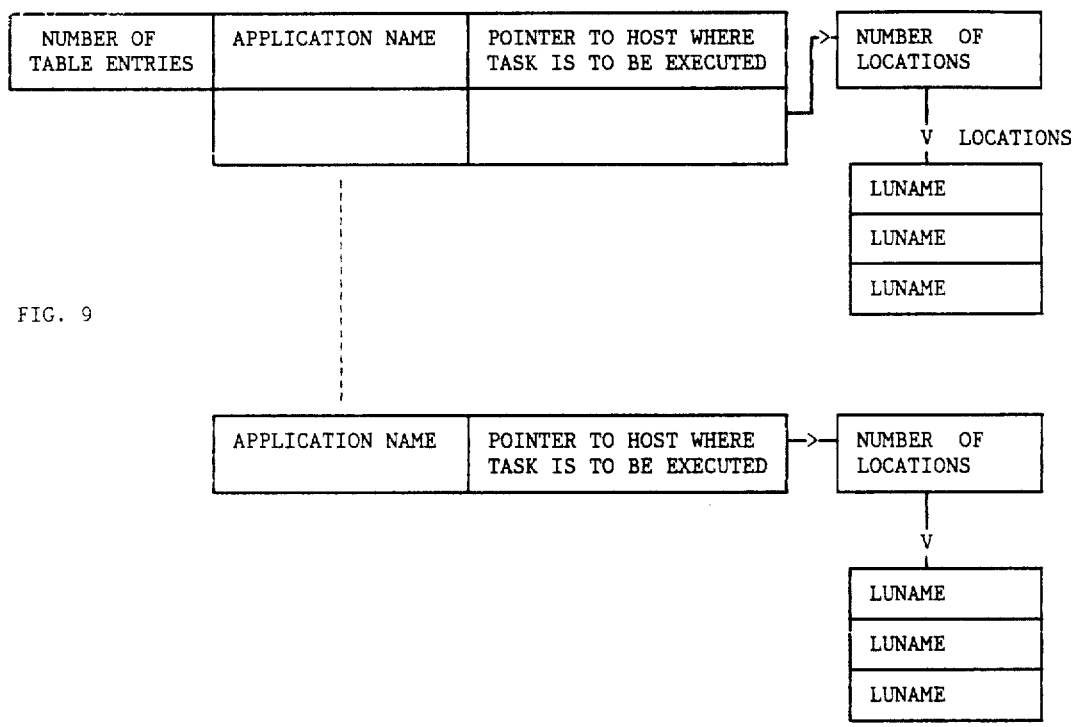
FIG. 9 illustrates the Time Application Information Table (TAIT) for storing information related to applications that are to be time initiated.

In accordance with the new method, a distributed application program is provided which has one part resident at the IWS and the second part which is resident at the host processor. The function of this distributed application program, which is called BATCH, is to provide a mechanism for the user to communicate to the host, the information that the host will subsequently require to initiate another application program at some future time. In order to minimize the amount of data entry required of the user, provision is made to maintain a Time Application Information Table (TAIT) at the host which is part of the Part B BATCH application resident at the local host. FIG. 9 illustrates the layout of the TAIT and the names of the various fields contained in the table. The number of entries that are in the table at any instant of time are maintained in order to insure that all entries are processed as required. The Name of an Application to be run and the pointer to the location of the host processor that is to run that application are included in one entry. The pointer is used to find the name or names of the processor(s) that are to run the application when the user elects not to specify which host processor should run the application. The entry as shown in FIG. 9 also includes a field to list the number of locations and the LUNAME of each location that should run the application. One or more locations may be specified.

Figures 10, 12:
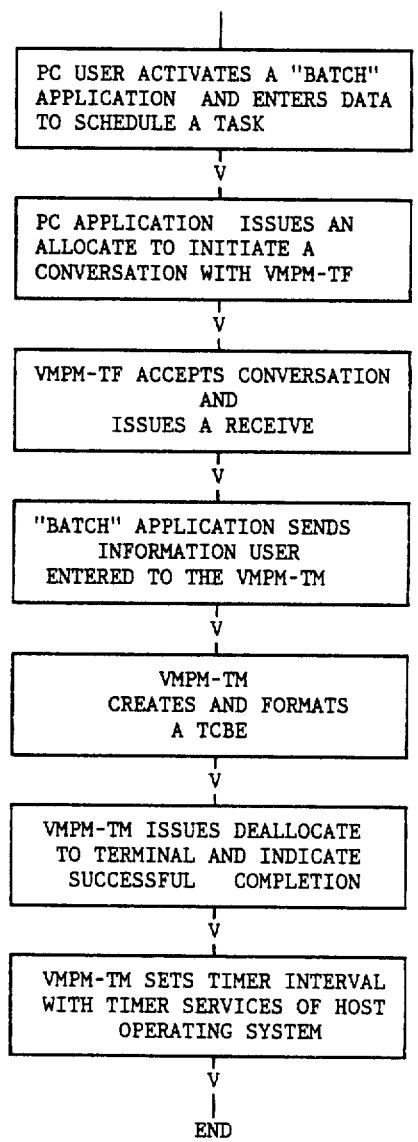
FIG. 10 illustrates the information which is solicited from the user when scheduling a time initiated task.
FIG. 12 is a flow chart illustrating the steps involved in the new method when the user is scheduling a time initiated task.

When a user at an IWS terminal desires to schedule a Time Initiated Task, such as Application-1 program, the application program Batch is invoked, for example by the user selecting that program from a menu of programs. The BATCH program presents to the user a screen which prompts the user for the information necessary to run Application-1. FIG. 10 is an example of the type of information that is requested. The Name of Job in this example would be Application-1. Time-1 is the time that the Application-1 should be executed and may be assumed in the present example to be 0300. Time-2 in the present example is blank. The function of Time is to designate a time that the local host will forward or relay the user initial request to the host processor of an interconnected system. The remote host is referred to as the target host. The location refers to the LUNAME where Application-1 is to be run. When the LUNAME is specified by the user, any data in TAIT is ignored.

After all the required information is entered into the IWS, the user indicates that the IWS may issue the LU 6.2 ALLOCATE verb by pressing the ENTER key or some similar operation. The ALLOCATE takes the following form;

| ALLOCATE | TPN | = | BATCH |
|---|---|---|---|
|  | USERID | = | DICKC |
|  | LUNAME | = | LU1 |

The ALLOCATE is transmitted to the host processor LU1 via the normal SNA protocols. The ALLOCATE is transferred to the VMPM by the AVS component of VTAM as described in the cross-referenced applications. The VMPM invokes the Time Function component of VMPM in response to the ALLOCATE parameter TPN=BATCH. VMPM-TF accepts the request for a conversation and issues a RECEIVE verb back to the IWS. The RECEIVE verb requests the IWS to send additional information. Through a series of APPC SEND verbs, the application at the IWS will send data that includes the name of the application, Application-1, that is being scheduled, and the time that it is scheduled to be activated, e.g. 0300. It will be assumed that the user did not enter the location where Application-1 is to be executed so that information that the user previously entered into the system and which is stored in the Time Application Information Table (TAIT) shown in FIG. 10 will be used. The IWS issues a DEALLOCATE to terminate the conversation and a message is displayed to the user that the transfer was successful.

Figure 11:
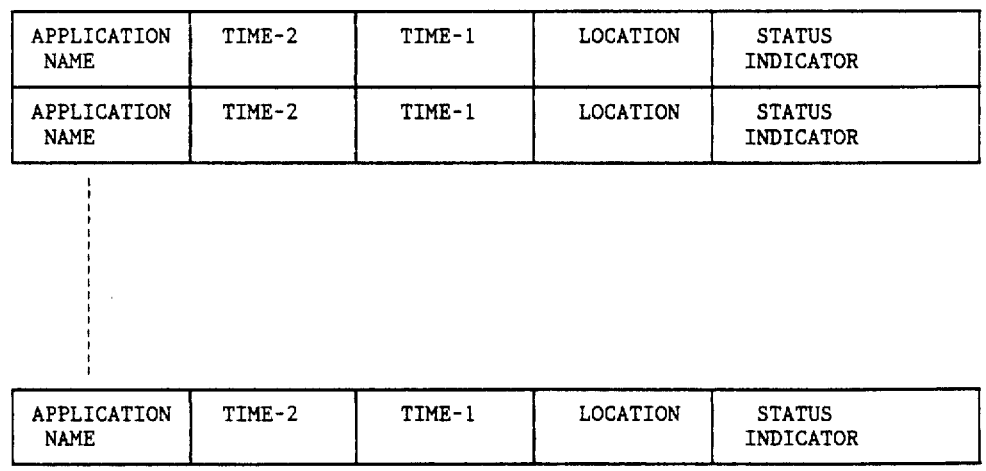
FIG. 11 illustrates a typical Time Control Block Entry (TCBE) for storing data related to a scheduled task.

The VMPM-TF creates a Time Control Entry Block in the form shown in FIG. 11. The information entered into the TCBE is obtained from the user and the TAIT. Since the TAIT contained an entry for APPLICATION-1 the information is used in creating one or more TCBEs. Assuming that only one entry was found in the TCBE the TCBE would consist of the following;

| APPLICATION NAME | = Application-1 |
|---|---|
| USERID | = DICKC |
| TIME-1 | = 0300 |
| TIME-2 | = BLANK |
| LOCATION | = LU2 |

If more than one location name was found in the TAIT for Application-1 a separate TCBE would have been created for each location.

After placing the TCBEs on the TCBE queue, the VMPM-TM also issues a request to the TIMER SERVICES of the Operating System. The request functions to alert the VMPM-TF when the scheduled time has arrived. The request generally takes the form of setting a time interval, after which the VMPM-TM is alerted by the TIMER-SERVICES. The timer services are generally activated by a specific system Call. The Caller supplies parameters with the CAll that tells the operating system to reactivated the caller after a specified time period has elapsed. The Caller can then go dormant until activated by the TIMER SERVICES. Under the above assumptions, the TIMER SERVICES will alert the VMPM-TM at 0300. The VMPM-TM then activates Application-1 on the host processor LU2 by effectively emulating the operation of an IWS when it sends an ALLOCATE verb to host LU2 to begin a conversation with APPLICATION-1. In that situation Part A of Application-1 is resident at the IWS. In the latter situation where Application-1 is a time initiated task, Part A of Application-1 is resident at host LU2.

In the situation where two locations LU2 and LU3 had been specified and two TCBEs had been created, Application-1 would have been invoked at LU2 and LU3.

If in the original example, the user had also specified a Time-2 as 1700 in the information that was sent to the VMPM-TM of the local host, then a slightly different operation occurs. At 1700 the local VMPM-FT will issue an ALLOCATE to the VMPM-TM of the target host processor which is assumed to be host processor LU3. The ALLOCATE verb establishes a conversation between the local VMPM-TM and the target VMPM-TM which is substantially identical to the original conversation that previously occurred between the IWS and the local VMPM-TM. The local VMPM-TM therefore forwards all of the scheduling information to LU3, that had been received from the IWS, except a value for Time-2, which is left blank. Host processor LU-3 then proceeds to execute Application-1 at 0300 in the manner described above.

Figure 13:
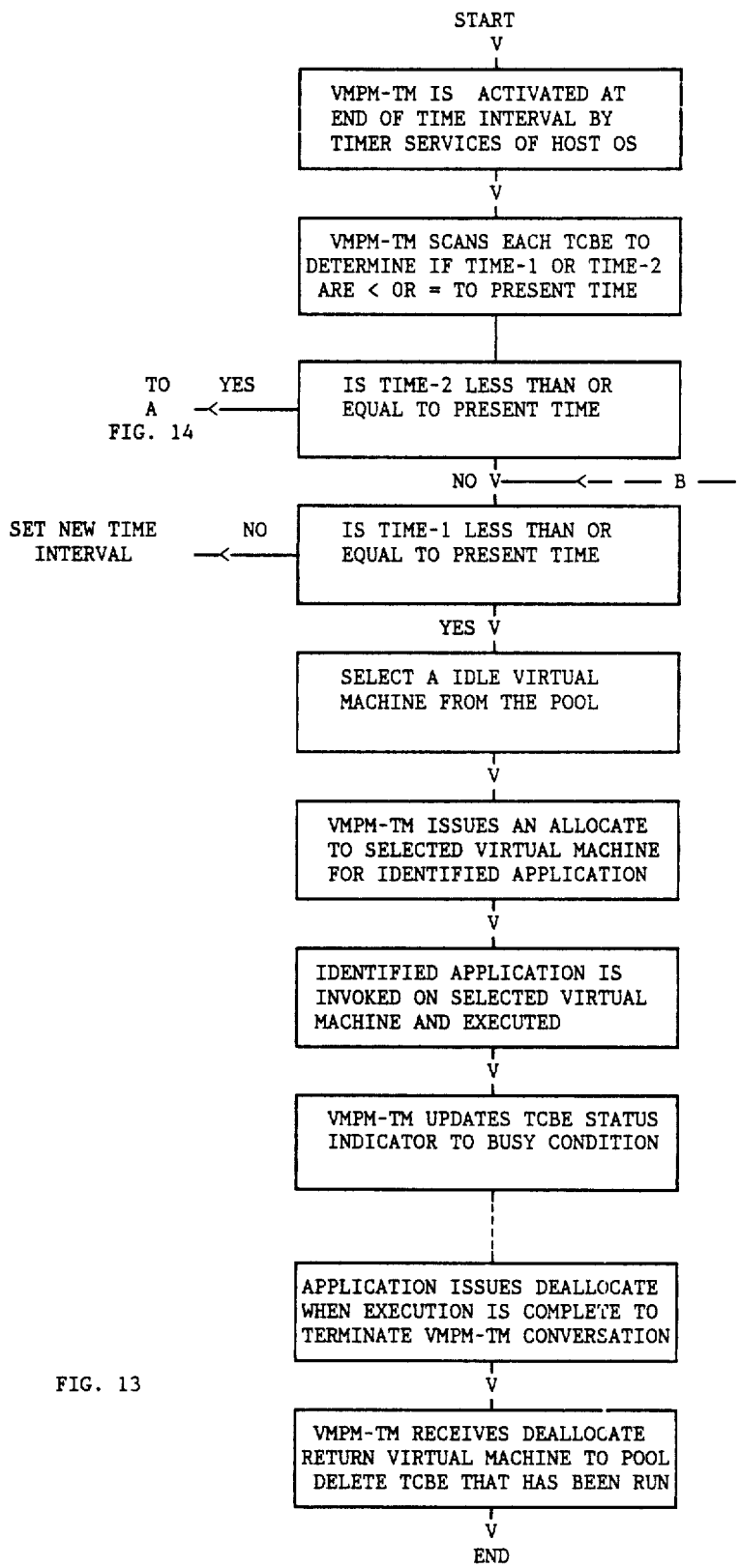
FIG. 13 is a flow chart illustrating the steps involved in the new method when a time initiated task is executed.
Figure 14:
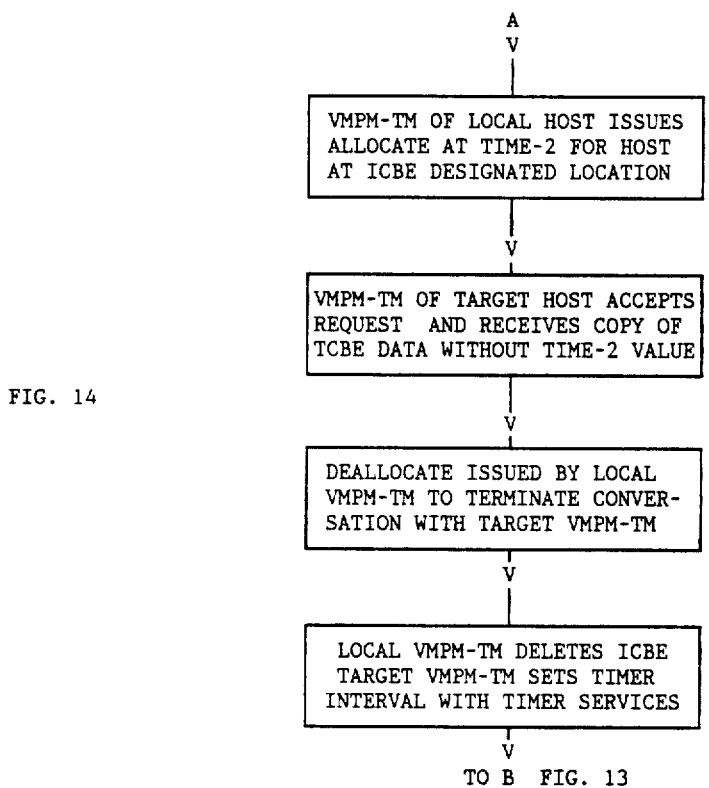
FIG. 14 is a flow chart illustrating the steps involved in the new method when the user requests the local host processor to forward a request to a target host processor at one specified time for a time initiated task to be executed by the target host at another specified time.

FIGS. 12, 13 and 14 are flow charts that summarize the steps involved in the above descriptions and are at a level which will be self explanatory to a person skilled in the art of programming distributed application programs that are written in accordance with LU 6.2 protocols.

While the invention has been shown and described with reference to the preferred embodiment, it should be understood by those persons skilled in the art that changes and modifications may be made without departing from the spirit of the invention or the scope of the appended claims.

I claim:

1. A method for scheduling time initiated tasks from an Intelligent Work Station (IWS) of an SNA network in which a host processor has created a plurality of run ready virtual machines which are assigned under control of a Virtual Machine Pool Manager in response to an LU 6.2 Allocate verb from said IWS to establish an LU 6.2 conversation between distributed parts of a scheduling program, one part of which is resident at the IWS and a second part of which is resident at the host, said method comprising the following steps;
   (A) storing at said host processor, scheduling information that identifies a first distributed application program and a scheduled time said application should be executed,
   (B) issuing, with said host processor at said scheduled time, and ALLOCATE verb to the VMPM of said host processor specifying the said first distributed application program, and
   (C) assigning an idle virtual machine from said pool to respond to said Allocate and establish in LU 6.2 conversation between the distributed parts of said first distributed application.

2. The method recited in claim 1 in which said scheduling program comprises first and second distributed parts, including the further step of,
   (D) maintaining at said IWS said first part of said scheduling program, and
   (E) maintaining at said host said second part of said scheduling program.

3. The method recited in claim 2 including the further step of,
   (G) invoking said first path of said scheduling program at said IWS when a user of said IWS indicates to said IWS that said user wants to schedule said first distributed application program for execution on a host processor, and
   (H) displaying a screen to a said user which prompts said user to enter predetermined information into said IWS concerning the scheduling of said first distributed application program.

4. The method recited in claim 3 including the further step of,
   (I) issuing with said first part of said scheduling program an LU 6.2 ALLOCATE verb requesting a conversation with said second part of said scheduling program maintained at said host, and
   (J) establishing an LU 6.2 conversation with said second part of said scheduling program to permit said predetermined information to be transferred to said host processor.

5. The method recited in claim 4 including the further steps of,
   (K) creating a Time Control Block Entry (TCBE) data structure with said second part of said scheduling program, and
   (L) storing in said TCBE selected scheduling information that was entered into said IWS by said user and transferred to said host processor from said IWS.

6. The method recited in claim 5 including the further step of,
   (M) creating with said VMPM, a Time Application Information Table data structure at said host processor for storing scheduling data at said host processor, that can be used to complete said TCBE for said first distributed application program whenever said information is not entered by said user.

7. The method recited in claim 6 in which said host processor has an Operating System which includes a TIMER SERVICES component, and said first distributed application program comprises a Part A and a Part B, including the further step of,
   (N) providing said VMPM with a Timer Function (TF) component which is operable in response to an alert signal from said Timer Services component in invoke said Part A of said distributed application program.

8. The method recited in claim 7 including the further step of,
   (O) calling said Timer Services component of said Operating System with said TF component and specifying a time interval parameter that determines when said alert signal is to be sent to said TF from said Timer Services.

9. The method recited in claim 8 including the further step of,
   (P) issuing, in response to said alert signal, an ALLOCATE verb with said Part A of said first application program to said VMPM requesting that an idle run ready virtual machine in said pool of virtual machines be assigned by said VMPM to establish a conversation with said Part B of said application program.

10. The method recited in claim 9, in which said SNA network includes a plurality of interconnected systems, each of which was a host processor and a plurality of IWSs and in which said scheduling program permits and application program to be scheduled from an IWS to run on a selected host processor of any one of said interconnected systems at a scheduled time, including the further steps of,
  (Q) assigning a unique network name to said host processor of each of said interconnected systems, and for each said selected host processor scheduled to run said first application program,
  (R) creating at said selected host processor a separate TCBE,
  (S) entering said unique name in said separate TCBE, and
  (T) processing each said separate TCBE at said scheduled time to send an ALLOCATE verb to said VMPM of said selected host processor, to cause said VMPM to assign an idle virtual machine from a pool of virtual machines at said host processor to service said conversation request represented in said received ALLOCATE verb, whereby each said selected host processor runs said application program at said scheduled time.

11. The method recited in claim 10 in which said scheduling program schedules a specified host processor to store and forward to a target host processor at a scheduled time-1, a scheduling request to initiate at said target host processor a specified distributed application program on said target host processor at a subsequent scheduled time-2, including the further steps of,
  (U) prompting said user for said scheduled time-1,
  (V) entering a value at said IWS for said time-1,
  (W) transferring said value to said specified host processor,
  (X) storing said value in a TCBE at said specified host processor, and
  (Y) forwarding said scheduling request to said target host processor at said time-1 in response to said alert signal from said timing services of said specified host.

12. The method recited in claim 11 including the further step of,
  (Z) issuing an ALLOCATE at said target host processor at said scheduled time-2 to initiate said execution of said specified distributed application program on a virtual machine from the pool of virtual machines that was previously created at said target host processor.

* * * * *